(12) United States Patent
Frutschi

(10) Patent No.: US 6,178,735 B1
(45) Date of Patent: Jan. 30, 2001

(54) COMBINED CYCLE POWER PLANT

(75) Inventor: Hans Ulrich Frutschi, Riniken (CH)

(73) Assignee: Asea Brown Boveri AG, Baden (CH)

(*) Notice: Under 35 U.S.C. 154(b), the term of this patent shall be extended for 0 days.

(21) Appl. No.: 09/208,830

(22) Filed: Dec. 10, 1998

(30) Foreign Application Priority Data

Dec. 17, 1997 (EP) ................................................. 97810993

(51) Int. Cl.$^7$ ............................... F02C 6/00; F01K 21/04
(52) U.S. Cl. ..................... 60/39.02; 60/39.182; 60/674
(58) Field of Search ........................... 60/39.02, 39.05, 60/39.182, 39.183, 674, 39.53, 39.511, 728

(56) References Cited

U.S. PATENT DOCUMENTS

| | | | |
|---|---|---|---|
| 4,660,376 | * | 4/1987 | Johnson ............................. 60/39.53 |
| 5,203,160 | * | 4/1993 | Ozono ................................ 60/39.02 |
| 5,386,685 | * | 2/1995 | Frutschi ............................ 60/39.02 |
| 5,884,470 | * | 3/1999 | Frutschi ............................ 60/39.05 |
| 5,906,095 | * | 5/1999 | Frutschi et al. ..................... 60/39.05 |

FOREIGN PATENT DOCUMENTS

| | | |
|---|---|---|
| 2925091 | 1/1981 | (DE) . |
| 2931178 | 2/1981 | (DE) . |
| 0050687A1 | 5/1982 | (EP) . |
| 0620362A1 | 10/1994 | (EP) . |
| 0770771A1 | 5/1997 | (EP) . |
| 1007140 | 5/1952 | (FR) . |
| WO97/04228 | 2/1997 | (WO) . |

* cited by examiner

*Primary Examiner*—Charles G. Freay
(74) *Attorney, Agent, or Firm*—Burns, Doane, Swecker & Mathis, L.L.P.

(57) ABSTRACT

In a method for operating a gas turbo-generator set (GT), the caloric potential of the exhaust gases (14) from the gas turbo-generator set (GT) is utilized by guiding them through a heat exchanger (5) which is operatively connected to a hot-air turbo-generator set (LT). A compressor (7) associated with this hot-air turbo-generator set (LT) is operated isothermally by means of point-focused or continuous water injection (24), and, after expansion (6) has taken place, the injected water is collected by condensation (19) in a separator (10). A circuit is thus provided, in which the adaptation of assemblies in order to achieve maximized efficiency is avoided.

4 Claims, 2 Drawing Sheets

COMBINED CYCLE POWER PLANT

BACKGROUND OF THE INVENTION

1. Field of the invention

The present invention relates to a combined cycle power plant.

2. Discussion of Background

Isothermal compression, together with the recuperation of exhaust gas heat, is a circulation configuration which is desirable for gas turbines. In this case, the most simply practicable approximation to isothermal compression is internal cooling by means of continuous water injection. In order to recover as large a part of the water as possible again, a recooler, if need be as the last intermediate cooling stage, must be provided. Both water injection into the compressor and recooling or intermediate cooling by means of a surface heat exchanger as well as, above all, the integration of an urgently required recuperator on the air side necessitate a complete redesign and construction of the gas turbine. Such an implementing procedure is therefore ruled out on economic grounds.

SUMMARY OF THE INVENTION

Accordingly, one object of the invention is to provide a novel mentioned in a combined cycle power plant of the initial invention type, to operate the gas turbine available on the market, as intended, without any modification, whilst maximizing efficiency.

This is achieved, according to the invention, by utilizing the thermodynamic effect of the recuperator in such a way that the high pressure air stream of a following hot-air turbine is heated. The latter, in turn, consists of a compressor with injection cooling, an uncooled expander and a generator. This turbo-generator set, that is to say its components, and the recuperator are assemblies currently on the market.

The essential advantage of the invention is therefore to be seen in that these assemblies do not present any problems in terms of either construction or operation on account of the very moderate circulation parameters.

The proposed circuit is also suitable for a sequentially fired gas turbo-generator set, such as may be gathered from the publication EP 0,620,363 A1.

Exemplary embodiments of the invention are explained in more detail below with reference to the drawings. All the elements not necessary for an immediate understanding of the invention have been omitted. The direction of flow of the media is indicated by arrows.

BRIEF DESCRIPTION OF THE DRAWINGS

A more complete appreciation of the invention and many of the attendant advantages thereof will be readily obtained as the same becomes better understood by reference to the following detailed description, when considered in connection with the accompanying drawings, wherein.

DESCRIPTION OF THE PREFERRED EMBODIMENTS

Figure 1:
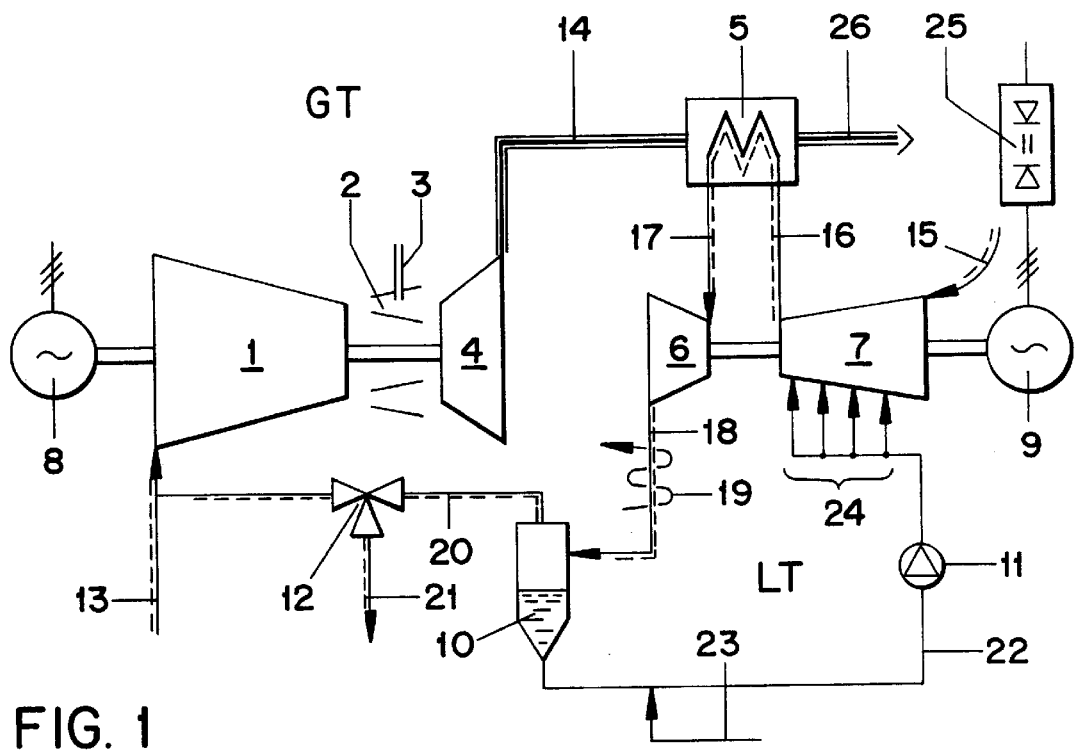
FIG. 1 shows a combined cycle power plant with a following open air-turbine process.

Referring now to the drawings, wherein like reference numerals designate identical or corresponding parts throughout the several views, FIG. 1 shows a power plant which consists of a gas turbo-generator set 10 GT and of a following open air-turbine process LT. The gas turbo-generator set itself is of conventional design: it consists of a compressor unit 1, a combustion chamber 2 operated with fuel 3, a following turbine 4 and a generator 8. Connected on the exhaust gas side of the turbine 4 is a recuperator 5 which corresponds approximately to the waste heat steam generator of a combined cycle plant. The exhaust gases 14 from the turbine 4 flow through this recuperator 5 which is operatively connected to the air-turbine process LT already mentioned, primarily to an expander turbo-generator set which consists of an expander 6, compressor 7 and generator 9. The intake air 15 to the lastmentioned expander 7, after compression, flows to the recuperator 5 and there undergoes caloric treatment by a heat exchange method, the flue gases 26 which occur as a result being discharged. The compressed air 16 from the compressor 7 flows through the recuperator 5, in which it undergoes caloric treatment before acting, as heated compressed air 17, on the expander 6. The expanded compressed air 18 then flows via a recooler 19 into a separator 10. The compressor 7 has injection cooling, so that the compressed air 16 subsequently treated per se in the recuperator 5 is moderately heated (at approximately 15 bar, 150°–560° C.). Accordingly, the expansion of the compressed air, compressed quasi-isothermally in the compressor 7 and heated in the recuperator 5, then takes place in the expander 6 with a respectable steam content, the latter being per se. unsaturated. The differential power released at the generator 9 is only insignificantly lower than the difference between polytropic and quasi-isothermal compressor power in a conventional plant. Depending on the pressure ratio of the expander 6, a small part of the steam is already condensing out toward the end of expansion. However, at least the greater part condenses in the recooler 19 already mentioned. From the following separator 10, the recooled air 20 flowing out of the latter then leaves the process via a line 21 which is operatively connected to a regulating member 12. In order to condition, that is to say cool or preheat, the intake air 13 of the gas turbo-generator set GT, as required, part of the recooled air 20 is guided into the intake air 13. The water condensed out of the expanded air 18 is collected in the separator 10 and is fed into the compressor 7 again, via a feed pump 11, for the purpose of internal cooling 24 by evaporation. The water losses are compensated for by means of a feedwater delivery line 23.

In this respect, a plurality of smaller gas turbines GT, even of different types, can cooperate with a large hot-air turbine LT. A plurality of small high-speed hot-air turbines LT can also be assigned to a high-power gas turbine GT. Their supersynchronous rotational speeds can be stabilized, for example, via a converter 25.

Figure 2:
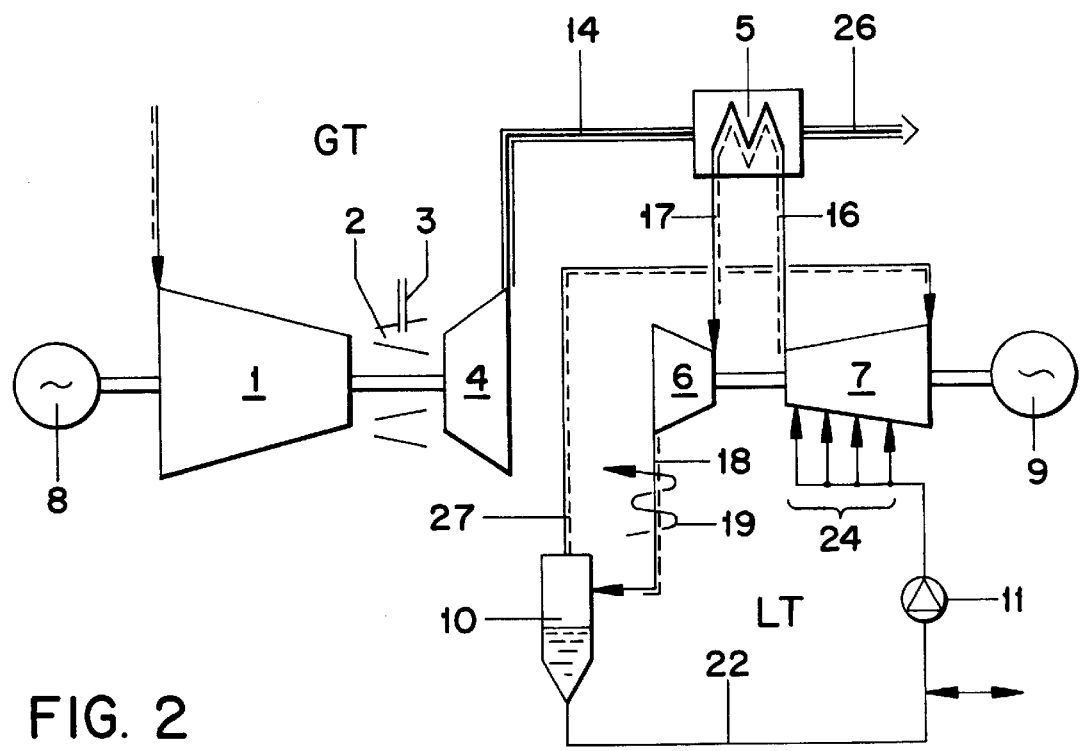
FIG. 2 shows a further power plant with a closed circuit.

FIG. 2 shows a configuration for minimizing the geometric dimensions of the hot-air turbine LT. Here, the circuit is closed, for the purpose of charging to a higher pressure level, via a line 27 leading off from the separator. This line 27 guides recooled air directly into the compressor 7. However, the pressure level should not be set too high here, at most at 3–4 bar in the case of a pressure ratio of approximately 8, because internal cooling of the compressor 7 otherwise results in temperatures which are too high.

Figure 3:
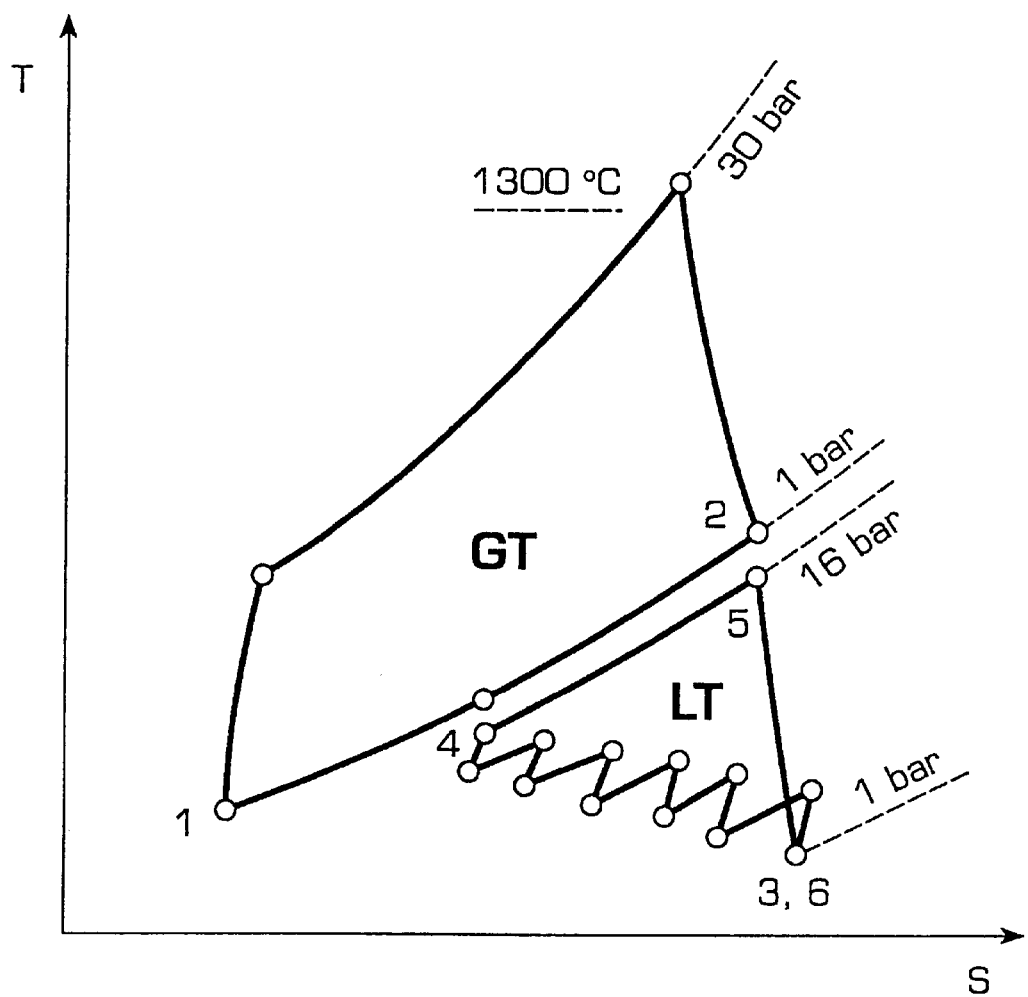
FIG. 3 shows a TS diagram in terms of the circuit according to FIGS. 1 and 2.

FIG. 3 shows the processes which are illustrated in FIGS. 1 and 2 and which are transferred to a TS diagram.

It must be assumed that the costs of a secondary hot-air-turbine process are lower than those of a steam process of a combined cycle plant. The recuperator 5 is substantially simpler than the heat exchanger of a steam process. The efficiency of the circuits shown here corresponds approximately to that of a STIG process. In contrast to the latter, however, the recovery of the water is substantially simpler, because the latter circulates in a closed circuit and because it comes into contact with clean air only.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A method for operating a gas turbo-generator set with single stage or multistage combustion, comprising the steps of providing a heat exchanger for further utilization of the caloric potential of exhaust gases from a turbine associated with the gas turbo-generator set, wherein a hot-air turbo-generator set is operatively connected to the heat exchanger;

approximately simulating isothermal compression by water injection which is carried out in a compressor associated with the hot-air turbo-generator set; and after expansion has taken place by an expander, collecting the injected water by condensation in a separator.

2. The method as claimed in claim 1, wherein the water is collected in the separator is recirculated for water injection into the compressor.

3. The method as claim in claim 1, wherein part of the air occurring from the separator is introduced into the intake air of a compressor associated with the gas turbo-generator set or into the process air of a turbomachine associated with the gas turbo-generator set.

4. The method as claimed in claim 1, wherein the air occurring in the separator is introduced into the compressor of the hot-air turbo-generator set.

* * * * *